United States Patent [19]
Miyazaki

[11] Patent Number: 5,467,933
[45] Date of Patent: Nov. 21, 1995

[54] CLUTCH MECHANISM IN A FISHING REEL

[75] Inventor: Takeo Miyazaki, Tokyo, Japan

[73] Assignee: Daiwa Seiko, Inc., Tokyo, Japan

[21] Appl. No.: 302,424

[22] Filed: Sep. 8, 1994

[30]    Foreign Application Priority Data

Sep. 10, 1993  [JP]  Japan ................................ 5-250003

[51] Int. Cl.⁶ ............................................... A01K 89/015
[52] U.S. Cl. ............................................................ 242/261
[58] Field of Search ................................... 242/259, 260, 242/261, 262, 257

[56]             References Cited

U.S. PATENT DOCUMENTS

| 4,593,869 | 6/1986 | Ysaui et al. | 242/261 |
| 4,697,760 | 10/1987 | Aoki | 242/261 |
| 4,819,893 | 4/1989 | Ueno | 242/261 |
| 4,919,360 | 4/1990 | Roberts | 242/261 X |

FOREIGN PATENT DOCUMENTS 59-15893  5/1984  Japan .

3-27426  6/1991  Japan .

Primary Examiner—Joseph J. Hail, III
Attorney, Agent, or Firm—Longacre & White

[57]              ABSTRACT

The invention relates to a clutch mechanism for a fishing reel which allows the user to operate the fishing reel smoothly and to achieve the condition switching operation quickly. The clutch mechanism includes a pinion which is detachably engaged with a spool rotatably mounted on a reel frame body, and is turned by the rotation of the handle, and which, when engaged with the spool, is turned together with the spool. The clutch mechanism further includes: a clutch member for causing the pinion to engage with and disengage from the spool; an urging member for urging the clutch member at all times so that the pinion is disengaged from the spool; a locking member for locking and holding the clutch member against the urging force of the urging member so that the pinion is engaged with the spool; and a releasing member which is externally operated to release the locking member.

3 Claims, 7 Drawing Sheets

CLUTCH MECHANISM IN A FISHING REEL

BACKGROUND OF THE INVENTION

This invention relates to a clutch mechanism in a fishing reel.

Almost all of the dual-bearing type fishing reels, and some of the single-bearing type fishing reels have a clutch mechanism adapted to switch a fishing-line take up condition over to a fishing-line release condition. For instance, Examined Japanese Utility Model Publication No. 15893/1984 has disclosed a clutch mechanism which has a switching member protruded from the outer periphery of the reel side plate which is provided on the side of the handle.

In addition, Examined Japanese Utility Model Publication No. 27426/1991 has disclosed a switching member which is provided between the reel side plates at the rear of the spool in such a manner that it is vertically swingable.

In the prior arts disclosed by those Publications, the switch member is directly coupled to a member forming the clutch mechanism. Hence, the operation of switching the fishing-line take up condition over to the fishing-line release condition requires a large operating stroke before it is accomplished. Hence, it is difficult to operate the fishing reel smoothly, and it is impossible to achieve the condition switching operation quickly.

SUMMARY OF THE INVENTION

Accordingly, an object of this invention is to provide a clutch mechanism for a fishing reel which allows the user to operate the fishing reel smoothly and to achieve the condition switching operation quickly.

The foregoing object of the invention has been achieved by the provision of a clutch mechanism for a fishing reel which comprises a pinion which is detachably engaged with a spool rotatably mounted on a reel frame body, and is turned by the rotation of the handle, and which, when engaged with the spool, is turned together with the spool, which, according to the invention, comprises:

a clutch member for causing the pinion to engage with and disengage from the spool;

urging means for urging the clutch member at all times so that the pinion is disengaged from the spool;

locking means for locking the clutch member against the urging force of the urging means so that the pinion is engaged with the spool; and releasing means which is externally operated to release the locking means.

When, under the condition that the locking member has locked the clutch member adapted to cause the pinion to engage with or disengage from the spool, thereby to lock the pinion to the spool, the clutch member is released from the locking means by operating the releasing means from outside, then the clutch member is driven by the urging means adapted to urge the latter at all times, so that the pinion is disengaged from the spool. In this operation, the releasing means operates as a trigger to provide a small stroke to leave the locking means from the clutch member. The clutch member left from the locking means is driven only by the urging force of the urging means.

DETAILED DESCRIPTION OF THE PREFERRED EMBODIMENTS

The invention will be described with reference to its preferred embodiments shown in the accompanying drawings.

First Embodiment

FIGS. 1 through 7 show the first embodiment of the invention.

A fishing reel, to which the technical concept of the invention is applied, comprises: a frame 10; a right reel side plate 12B on the right of the frame 10; and a left reel side plate 12A on the left of the frame 10. The frame 10, and the right and left side plates 12B and 12A form a reel frame body. A spool shaft 16 is rotatably supported by the reel frame body. A spool 14, on which the fishing line is wound, is mounted on the spool shaft 16 in such a manner that it rotates together with the latter 16.

Figure 2:
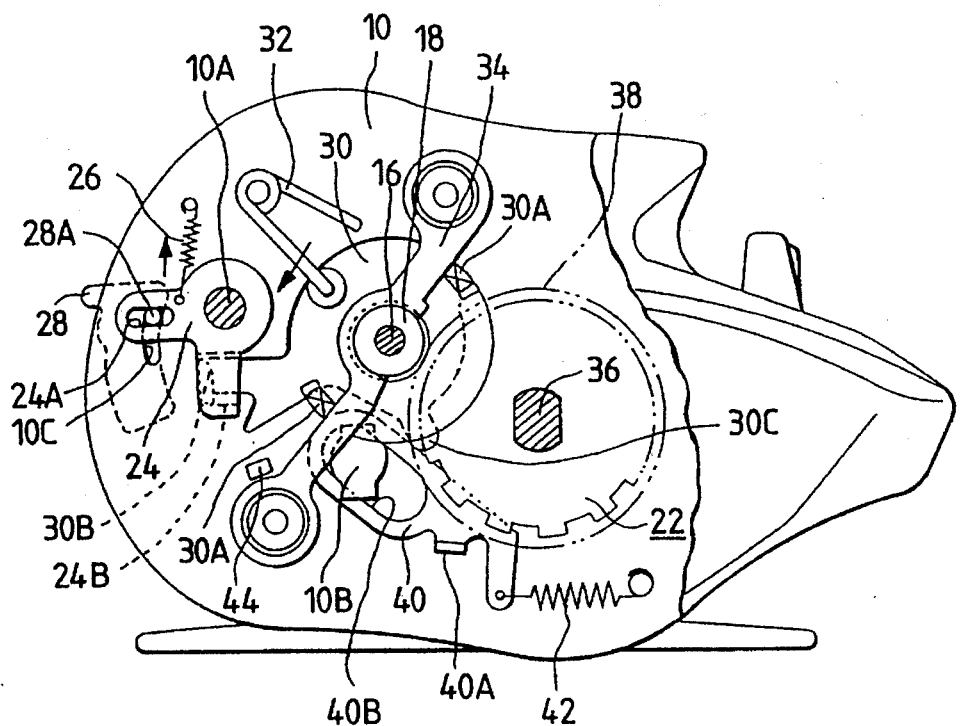
FIG. 2 is a side view, with parts cut away, of the fishing reel shown in FIG. 1.

A clutch mechanism, as shown in FIG. 2, is built in the right reel side plate 12B on which a handle 20 is mounted. A pinion 18 is coupled to the spool shaft 16 in such a manner that, as it is slid in a direction perpendicular to the surface of the drawing of FIG. 2 (i.e., along the spool shaft), it is engaged with or disengaged from the spool shaft 16. In the case where the pinion 18 has been engaged with the spool shaft 16, it is turned together with the spool shaft 16; and in the case where the pinion 18 has been disengaged from the spool shaft 16, they operate independently of each other.

The pinion 18 is kept engaged with a drive gear 38 which is mounted on a handle shaft 36 coupled to the handle 20. On the other hand, the pinion 18 is kept urged axially of the spool shaft 16 by a spring (not shown), so that it is normally locked to the spool shaft 16.

A clutch arm 34, which is a part of the clutch member, is engaged with the pinion 18. The clutch arm 34 is so designed as to be slidable along the spool shaft 16. A clutch cam 30, which is also a part of the clutch member, is rotatably arranged around the spool shaft 16. The clutch cam 30 includes a pair of cam portions 30A having a sloped surface. The clutch cam 30 is provided with a spring 32. Both ends of the spring 32 are engaged with the clutch cam 30 and the frame 10 of the reel frame body, respectively, so that the clutch cam 30 is kept urged counterclockwise, in the direction of the arrow, in FIG. 2.

Figure 3:
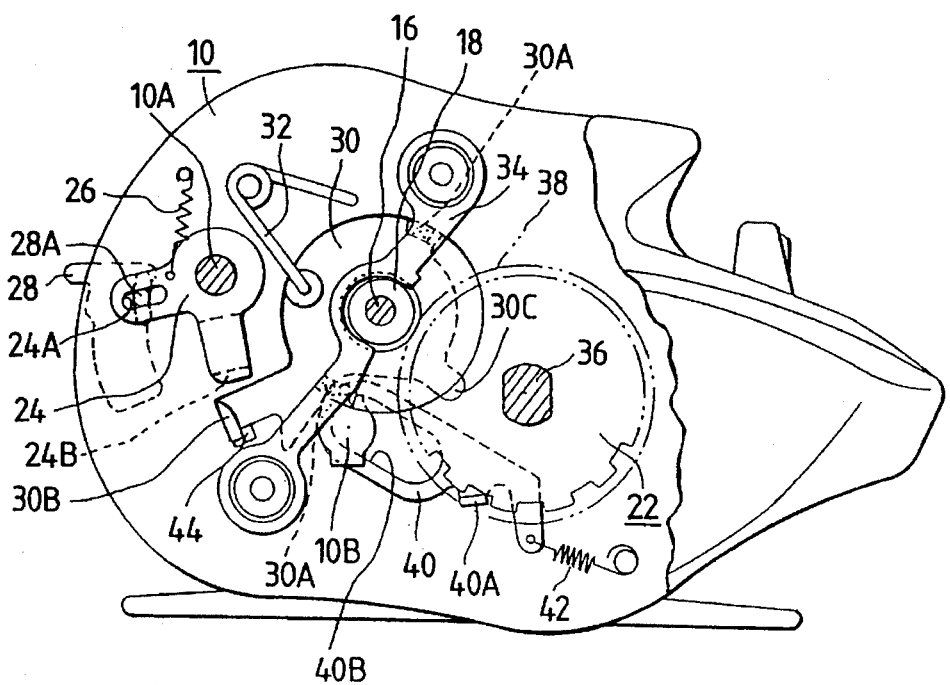
FIG. 3 is also a side view, with parts cut away, of the fishing reel shown in FIG. 2 whose state has been changed.

As the clutch cam 30 is turned by the elastic force of the spring, the cam portion 30A is gradually moved to come under the clutch arm 34 with the aid of the sloped surfaces as shown in FIG. 3. As a result, the clutch arm 34 causes the pinion 18 to slide along the spool shaft 16 to disengage from the latter 16.

A locking member 24 is rotatably mounted on a shaft 10A which is protruded from the frame 10. The locking member 24 has a locking portion 24B at the end. On the other hand, the clutch cam 30 includes an engaging portion 30B which is engageable with the locking portion 24B of the locking member 24. The locking member 24 is kept urged clockwise, in the direction of the arrow in FIG. 2, about the shaft 10A by a spring 26.

Figure 1:
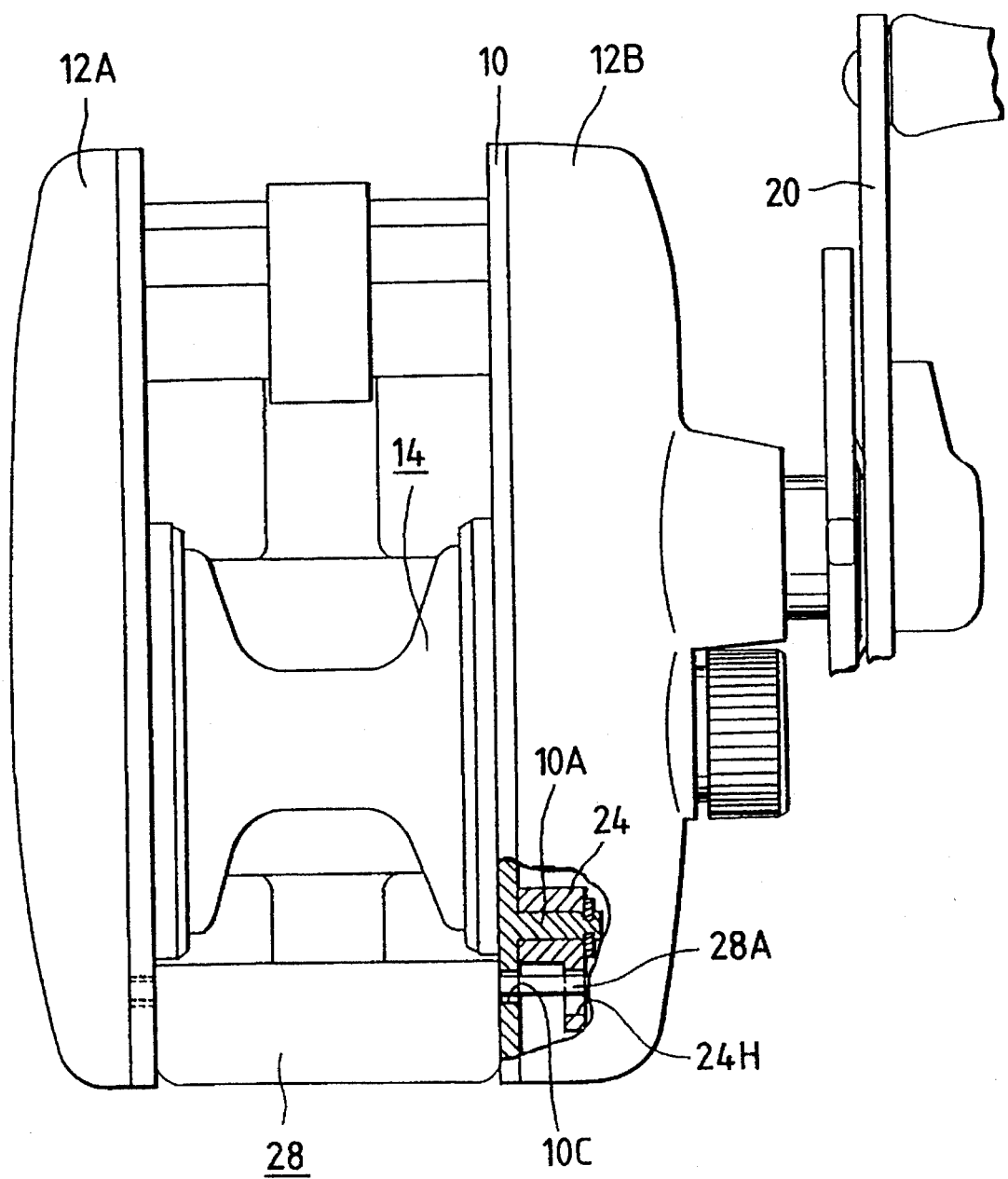
FIG. 1 is a plan view, with parts cut away, showing an example of a fishing reel, which constitutes a first embodiment of the invention.

As shown in FIG. 1, the fishing reel has releasing means, namely, a lever member 28 in the back. The lever member 28 includes a pin member 28A, which is inserted through an elongated arcuate hole 10C formed in the frame 10 into an elongated hole 24A formed in the locking member 24. The pin member 28A is normally set at the upper position by the elastic force of the spring 26 as shown in FIG. 2. The engaging portion 30B is locked by the locking portion 24B, and the clutch cam 30 is held at rest against the elastic force of the spring 32.

When, under this condition, the handle 20 is turned, the torque is transmitted through the drive gear 38, the pinion 18, and the spool shaft 16 to the spool 14 to take up the fishing line. When, under this condition, the lever member 28 is slightly pushed down to the position indicated by the two-dot chain line (28') in FIG. 4, the locking member 24 is turned counterclockwise about the shaft 10 as much as the thickness of the engaging member 30B of the clutch cam 30, so that the locking portion 24B is disengaged from the engaging portion 30B. As a result, the clutch cam 30 is turned counter-clockwise by the elastic force of the spring 32, and is then stopped abutting against a rubber member 44 secured to the frame 10, and the pinion 18 is disengaged from the spool shaft 16 as was described before. Hence, the spool 14 together with the spool shaft is idled, to let the fishing line go.

A shaft member 10B is protruded from the frame 10. The shaft member 10B is engaged with a kick plate 40 through an elongated hole 40B formed in the latter 40. The kick plate 40 is normally kept urged by a spring 42. Where an operation of normally taking up the fishing line is permitted as in the case of FIG. 2, with the aid of the retaining portion 30C of the clutch cam 30 the kick portion 40A of the kick member 40 is set away from a ratchet 22 mounted on the handles shaft 36.

In the case where, as shown in FIG. 3, the spool 14 is freely rotatable, the clutch cam 30 turns and the retaining portion 30C is away from the kick plate 40. Hence, the latter 40 is pulled by the spring 42, so that the kick portion 40A is engaged with the ratchet 22. When, under this condition, the handle 20 is turned to rotate the ratchet 22, the kick member 40 is pushed upwardly to the left through the kick portion 40A in FIG. 3.

As a result, the clutch cam 30 is turned clockwise against the elastic force of the spring 32. When the clutch cam 30 has been turned to the position indicated by the solid line in FIG. 5, the arcuate surface 30S of the engaging portion 30B of the clutch cam 30 is moved along the arcuate surface 24S of the locking portion 24B of the locking member 24. Thus, as indicated by the two-dot chain line in FIG. 5 or as indicated by the solid line in FIG. 6, the locking member 24 is slightly turned counterclockwise about the shaft 10A, and finally the engaging portion 30B is moved over the locking portion 24B, thus being engaged with the latter again as indicated by the solid line FIG. 4.

Since the locking member 24 is kept pulled by the spring 26, the locking portion 24B locks the clutch cam 30 through the engaging portion 30B. In this state, the cam portions 30A of the clutch cam 30 are spaced away from the clutch arm 34. Therefore, the pinion 18 together with the clutch arm 34 is slid by the elastic force of a spring (not shown), thus being locked to the spool shaft 16. Now, the fishing line can be wound on the spool 14 by turning the handle 20.

Figure 4:
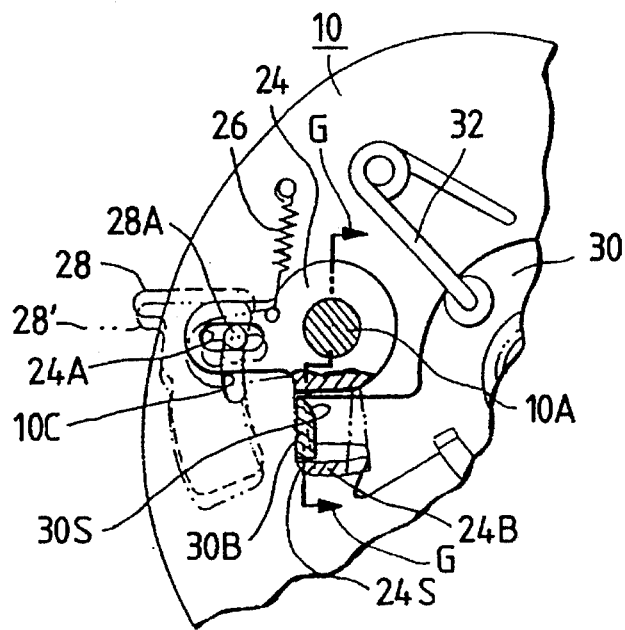
FIGS. 4 through 6 are explanatory diagrams for a description of the operation of the fishing reel.
Figure 5:
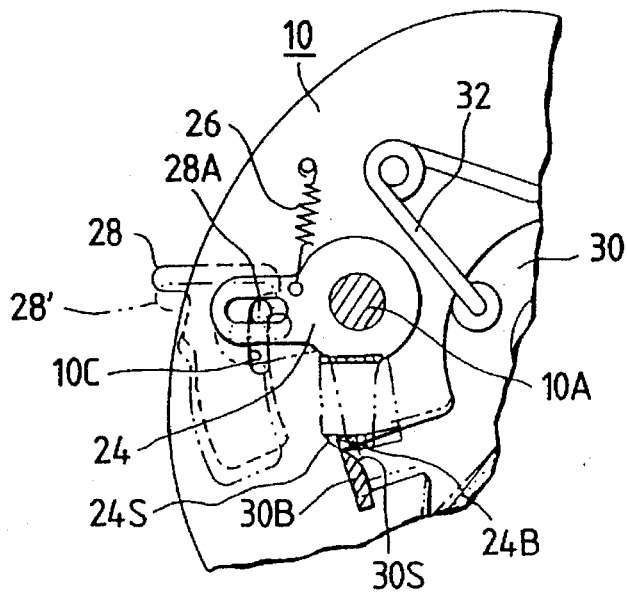
Figure 6:
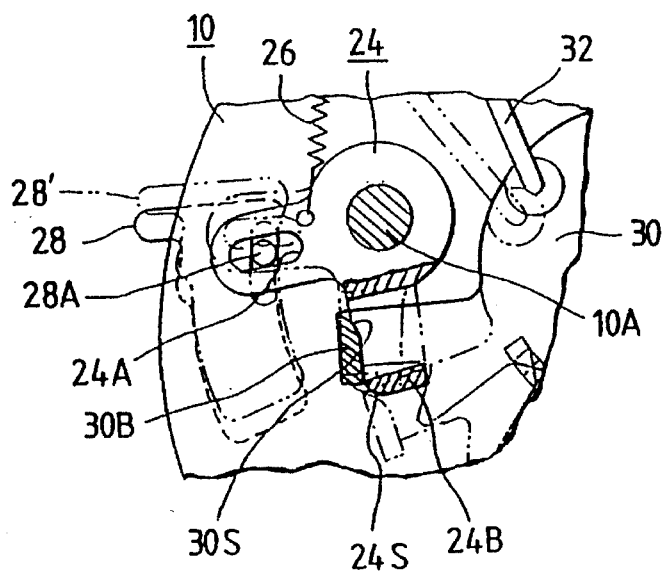
Figure 7:
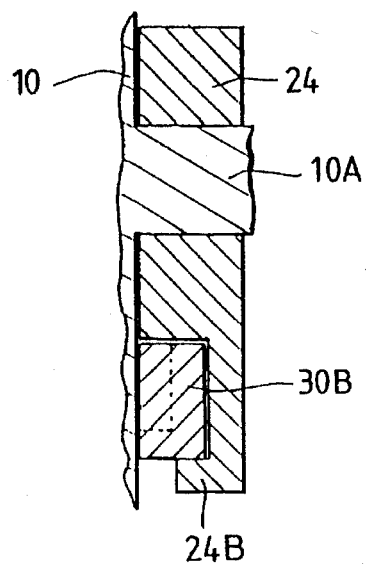
FIG. 7 is a sectional view taken in the direction of the arrows substantially along line G—G in FIG. 4.

As is apparent from the above description, in the first embodiment, the fishing-line take up condition as shown in FIG. 2 can be switched over the fishing-line release condition shown in FIG. 3 by slightly pushing the lever 28 down to the position 28' shown in FIGS. 4 or 6 as much as the locking member 24 turns through an angle corresponding to the thickness of the engaging portion 30B of the clutch cam 30. Thus, with the clutch mechanism according to the invention, the fishing reel can be operated smoothly, and the fishing-line take up condition can be quickly switched over to the fishing-line release condition.

Second Embodiment

FIGS. 8 through 13 show a second embodiment of the invention. Similarly as in the first embodiment, a pinion 18 is detachably mounted on a spool shaft 16. A clutch arm 74 is engaged with the pinion 18 in such a manner that it is movable axially of the spool shaft.

Figure 9:
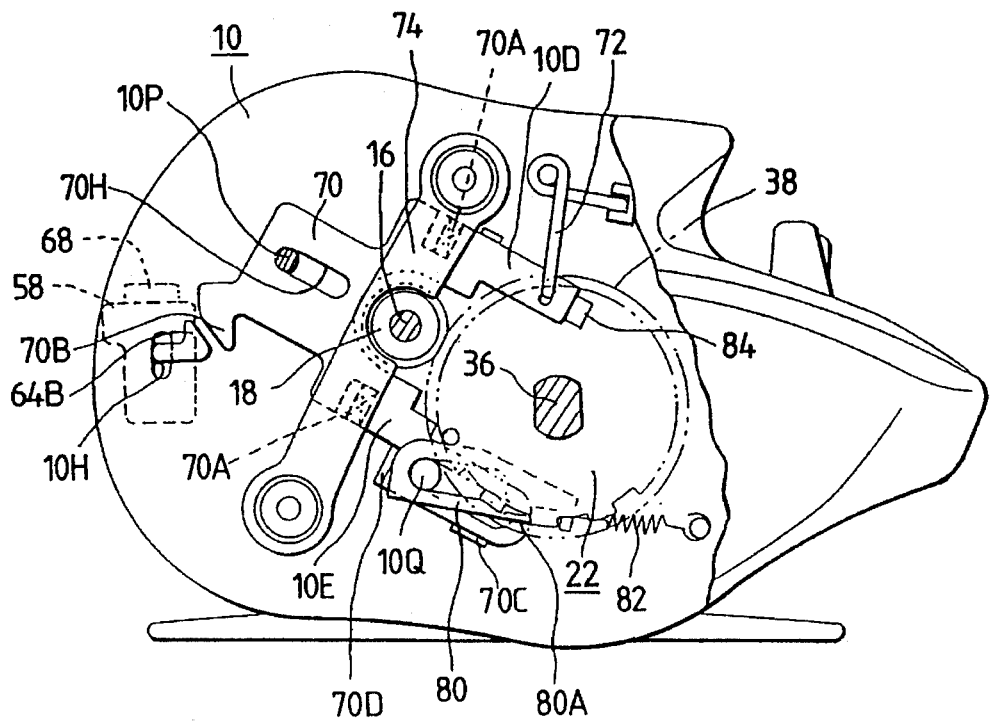
FIG. 9 is a side view, with parts cut away, of the fishing reel shown in FIG. 8 whose state has been changed.

On the other hand, a pin member 10P is protruded from the frame 10. A clutch cam 70 having an elongated hole 70H and legs 10D and 10E on both sides, is engaged with the pin member 10P through the elongated hole 70H in such a manner that it is slidable along the latter 70H. The clutch cam 70 includes a pair of cam portions 70A which are similar to those 30A of the first embodiment. When the clutch cam 70 slides to the position as shown in FIG. 9, the clutch arm 74 is pushed axially of the spool shaft 16, so that the pinion 18 is disengaged from the spool shaft 16.

The clutch cam 70 is slid in the predetermined direction because its leg 10E is guided by another pin member 10Q. One end of a spring 72 is coupled to the leg 10D of the clutch cam 70 so that the clutch cam 70 is kept urged in the direction of the arrow.

Figure 12:
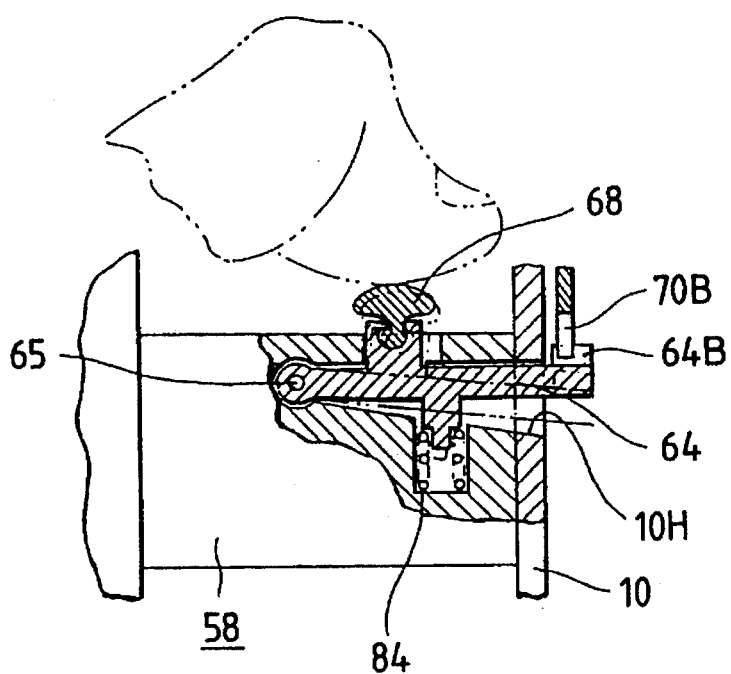
FIG. 12 is a sectional view taken in the direction of the arrows substantially along line L—L in FIG. 10.

On the other hand, a finger placing stand 58 is provided in the back of the fishing reel. Releasing means, namely, a pushing member 68 is provided on the finger placing stand 58. A locking member 64 coupled to the pushing member 68 has a locking portion 64B at one end. As shown in FIG. 12, the locking member 64 is swingable about a fulcrum 65, and it is extended through an elongated hole 10H formed in the frame 10, and is kept urged upwardly by a spring 84.

The clutch cam 70 further includes an engaging portion 70B at one end, which is normally engaged with the locking portion 64B of the locking member 64. Hence, the pinion 18 is engaged with the spool shaft 16, and as the handle is turned, the spool 14 is turned through the pinion 18, to take up the fishing line.

Figure 11:
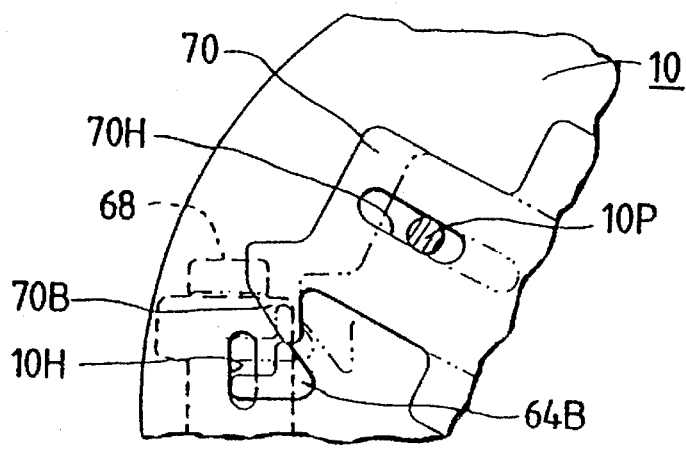

When, under this condition, the pushing member 68 is slightly pushed downwardly, then the downward movement being enlarged, the locking portion 64B of the locking member 64 is moved to the position indicated by the solid line in FIG. 11. As a result, the engaging portion 70B is disengaged from the locking portion 64B, so that the clutch cam 70 is slid along the elongated hole 70H by the elastic force of the spring 72, and the leg 10D is stopped being abutted against a rubber member 84.

In this operation, the cam portions 70A of the clutch cam 70 go under the clutch arm 74, so that the pinion 18 together with the clutch arm 74 is slid along the spool shaft 16, thus being disengaged from the spool shaft 16. Hence, the spool 14 is idled to release the fishing line.

Similarly as in the first embodiment, a kick plate 80 having an elongated hole is engaged with the aforementioned pin member 10Q through the elongated hole, and is kept pulled by a spring 82. On the other hand, the leg 10E of the clutch cam 70 has a holding portion 70C. In the case where the fishing reel is in normal state as shown in FIG. 8; that is, in the case where the fishing line can be wound on the spool, the kick plate 80, even when pulled by the spring 82, is held as shown in FIG. 8, and the kick portion 80A of the kick plate 80 is not engaged with the ratchet 22 mounted on the handle shaft 36.

However, in the case where the fishing reel is ready for releasing the fishing line, the clutch cam 70 has been pushed down in the direction of the elongated hole 70A, and the holding portion 70C has been spaced away from the position beside the pin member 10Q. Therefore, the kick plate 80, being pulled by the spring 82, is turned about the pin member 10Q, so that the kick portion 80A is engaged with the ratchet 22. Hence, by turning the handle, the ratchet 22 is turned, so that, with the aid of the kick portion 80A, the kick plate 80 is pushed upwardly so as to move away from the pin member 10Q. In this operation, the kick plate 80 pushes the clutch cam 70 upwardly with the aid of its bent portion 70D.

When the engaging portion 70B of the clutch cam 70 is raised in the above-described manner, it is abutted against the slope surface of the locking portion 64B of the locking member 64, so that it is raised while pushing the locking member 64 downwardly. As a result, the engaging portion 70B is set as shown in FIG. 11. When, under this condition, the clutch cam 70 is slightly raised, the engaging portion 70B of the latter 70 is engaged with the locking portion 64B of the locking member 64. At the same time, the locking member 64 is raised to the upper end of the elongated hole 10H by the elastic force of the spring 84. Thus, the locking member 64 is set as shown in FIG. 10.

Figure 8:
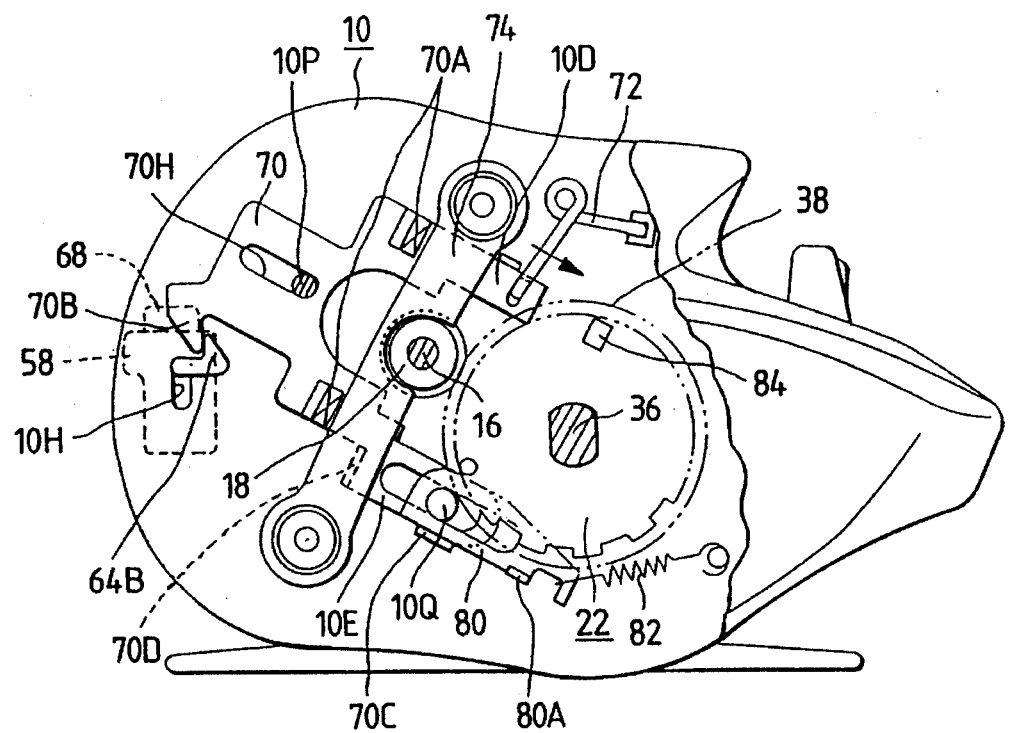
FIG. 8 is a side view, with parts cut away, showing another example of the fishing reel, which constitutes a second embodiment of the invention.
Figure 10:
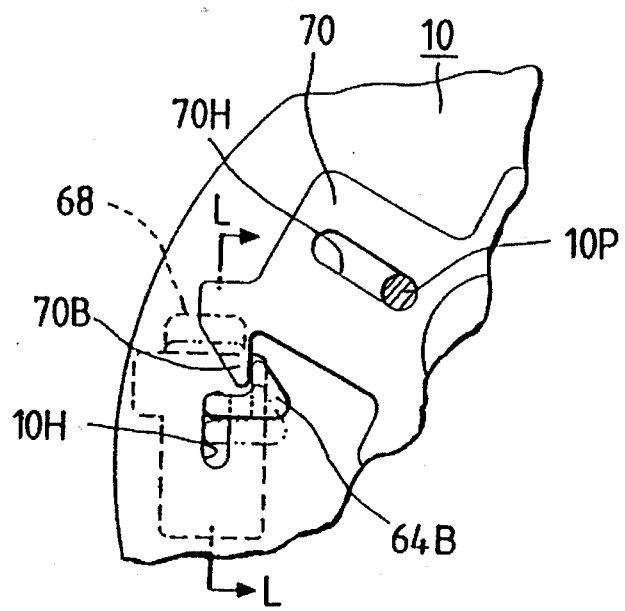
FIGS. 10 and 11 are explanatory diagrams for a description of the operation of the fishing reel shown in FIG. 8.

The state of the locking member 64 shown in FIG. 10 corresponds to the state of the fishing reel shown in FIG. 8. Hence, the cam portions 70A of the clutch cam 70 have come out from under the clutch arm 74, and the latter 74 together with the pinion 18 is driven in 'the direction of the spool shaft 16 by the spring (not shown), so that the pinion 18 is engaged with the spool shaft 16, thus being turned together with the latter 16. Hence, by turning the handle, the spool 14 together with the pinion 18 is rotated, to take up the fishing line.

Figure 13:
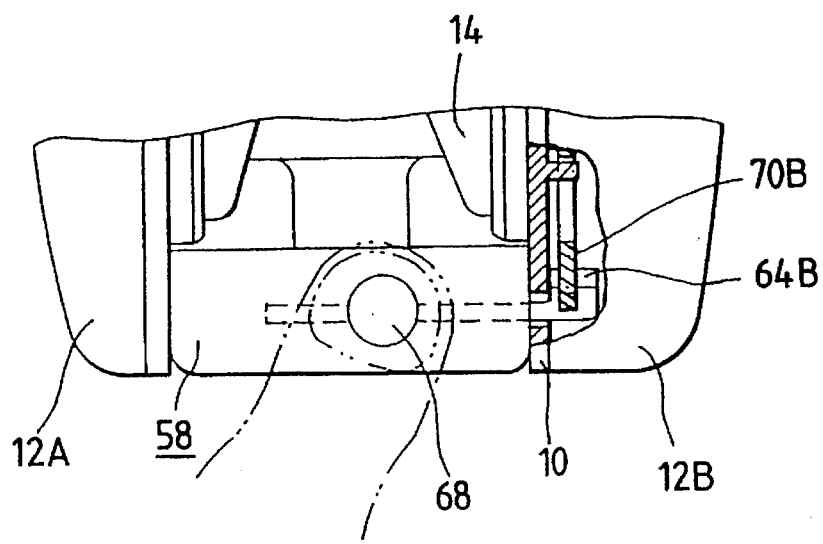
FIG. 13 is a plan view of some of the components shown in FIG. 12.

In the second embodiment, the locking member 64 is swung about the fulcrum 65; however, it may be so modified that it is merely moved up and down being pushed by the pushing member 68. As shown in FIG. 13, the pushing member 68 is provided on the finger placing stand 58 near the center; however, the pushing member may be provided on the finger placing stand 58 near the end so that it may not obstruct the placement of the finger on the finger placing stand during fishing.

In the above-described embodiments, the spool shaft and the spool are turned as one unit. However, in the case where the spool is rotatably mounted on the spool shaft, the pinion should be so designed that it is detachably engaged with the spool.

As is apparent from the above description, in the clutch mechanism of the invention, the clutch member is adapted to cause the pinion to engage with or disengage from the spool, and the locking means is adapted to lock the clutch member thereby to lock the pinion to the spool. Merely by releasing the locking means the clutch member is driven by the urging means, so that the pinion is disengaged from the spool. Thus, the condition switching operation is achieved merely by providing the small stroke to allow the locking means to leave from the clutch member. Hence, the clutch mechanism according to the invention allows the user to operate the fishing reel smoothly and to achieve the condition switching operation quickly.

What is claimed is:

1. A clutch mechanism in a fishing reel which comprises a pinion which is detachably engaged with a spool rotatably mounted on a reel frame body, and is turned by the rotation of the handle, and which, when engaged with said spool, is turned together with said spool, said clutch mechanism comprising:

a clutch member for causing said pinion to engage with and disengage from said spool;

urging means for urging said clutch member at all times so as to disengage said pinion from said spool;

locking means for locking said clutch member against the urging force of said urging means so that said pinion is engaged with said spool; and releasing means which is externally operated to release said locking means.

2. The mechanism according to claim 1, wherein when said releasing means releases said locking means, said pinion is disengaged from said spool by the urging force of said urging means.

3. The mechanism according to claim 1, further comprising:

returning means for moving said clutch member into a position where said locking means locks said clutch member against the urging force of said urging means, said returning means being actuated when said handle is rotated under a condition that said releasing means releases said locking means.

* * * * *